Patented Apr. 24, 1951

2,549,945

UNITED STATES PATENT OFFICE 2,549,945

PROCESS FOR THE PRODUCTION OF A LEAD ARSENATE IN THE FORM OF FLAT, PLATE-LIKE CRYSTALS

Robert J. Thrift, Munster, Ind., assignor to E. I. du Pont de Nemours & Company, Wilmington, Del., a corporation of Delaware No Drawing. Application April 26, 1945, Serial No. 590,501

4 Claims. (Cl. 23—54)

1

This invention relates to the manufacture of lead arsenate. It is particularly directed to the methods for preparing lead arsenate in the form of flat plate-like crystals, the so-called flat type lead arsenate which has had wide customer acceptance in the insecticidal field, particularly among fruit growers. This acceptance is due, in part, to the lustrous deposit which this type of lead arsenate leaves on foliage and fruit.

It is an object of this invention to provide new and improved methods for making flat type lead arsenate. It is a further object of the invention to provide such methods which are economical and efficient. It is a further object of the invention to provide methods by which flat type lead arsenate may be prepared from relatively low reactive type litharges. It is a further object of the invention to provide methods by which flat type lead arsenate may be produced from low reactive litharges with smaller amounts of catalyst than heretofore possible. It is a further object of the invention to avoid the disadvantages of the prior art and to obtain advantages as will appear as the description proceeds.

According to U. S. Patent 2,184,890, flat type lead arsenate is produced in a two-phase process, the reaction being carried out in the first phase in the presence of an excess of litharge and in the second phase in the presence of an excess of arsenic acid. This process requires elaborate control to assure satisfactory operation in view of the necessity of carrying out the initial phase of the reaction at pH 4 to 8 and then shifting in the second phase of the reaction to pH 1.5 to 2.5. The process suffers the further disadvantage of requiring excessively large quantities of catalyst (acetic or other acid) when a litharge of relatively low reactivity is used. This increases the cost of the operation either by reason of the increased amount of catalyst required in each batch or by reason of the greater expense of the more reactive types of litharge, for example, sublimed litharge as against a technical product.

The objects of the invention are accomplished and the disadvantages of the prior art as outlined above are avoided in the present invention by effecting reaction between arsenic acid and litharge in an aqueous medium containing an acidic catalyst while maintaining the acidity of the reaction medium between $pHx$ and $pH(x+1)$,

2 where $pHx$ is the pH of the aqueous solution of the acidic catalyst.

In effecting reaction between arsenic acid and litharge it is customary to employ a catalyst in order to accelerate the rate of reaction. The catalyst usually employed is acetic acid, but other acids such as nitric acid, sulfamic acid, and lactic acid may be employed. The effect of these acids is to react with the litharge to form a soluble lead salt which in turn reacts with the arsenic acid. Consequently, any acidic material reactive with litharge to form a water-soluble lead salt may be utilized as the catalytic agent in the process.

In carrying out the processes of the invention the arsenic acid-litharge strike is effected in an aqueous medium containing an acidic catalyst while maintaining the acidity of the reaction medium between $pHx$ and $pH(x+1)$, where $pHx$ is the pH of the aqueous solution of the acidic catalyst. For example, an aqueous solution of the acidic catalyst is prepared and litharge and arsenic acid are introduced into this solution with adequate agitation to maintain uniformity in the reaction medium in proportions to maintain the acidity of the reaction medium between the pH of the initial aqueous solution of acidic catalyst and one pH point above.

Any suitable method and apparatus may be utilized in effecting the strike. It is ordinarily desirable separately to prepare a solution of arsenic acid in water and a slurry of litharge in water and to introduce the two into the reaction medium with suitable agitation as required to maintain uniformity. A batch tank, for example, may be charged with an aqueous solution of acidic catalyst and separate streams of arsenic acid solution and litharge slurry run in simultaneously with appropriate agitation. It is convenient to maintain a constant flow of litharge slurry by means of a suitable orifice and to regulate the flow of the arsenic acid solution as required to maintain the desired pH in the reaction medium. By a suitable valve in the arsenic acid flow line, the rates of flow may be easily balanced to maintain the pH above and within one pH point of the pH of the aqueous solution of acidic catalyst.

The invention may be more fully understood by reference to the following example in which the parts are by weight unless otherwise specified.

Example 1

A batch tank is charged with 1720 parts of water to which is added 11 parts of 56% acetic acid. The solution thus obtained has a pH of 3.2 at 118° F. In another tank there is prepared a litharge slurry containing 760 parts of litharge and approximately 1058 parts of water, and in another tank there is prepared an arsenic acid solution having a specific gravity of 52.3° Bé. at 97° F. (approximately 58.0% $H_3AsO_4$). The litharge slurry is then run into the batch tank at a rate of about 31 lb. of litharge per minute. The arsenic acid solution is simultaneously run into the batch tank at the rate required to maintain as nearly as possible the acidity of the reaction medium at pH 3.2 to 4. Throughout the addition of arsenic acid and litharge, the reaction medium is maintained in a state of agitation so that the reagents and reaction products are continually and uniformly dispersed therein. The following conditions were observed throughout the strike.

| | |
|---|---|
| Batch starting temperature ° F | 118 |
| Batch finishing temperature ° F | 155 |
| Maximum pH | 4.3 |
| Minimum pH | 2.7 |

On completion of the strike the end point was adjusted by adding litharge to pH 4.2. The batch slurry then contained 25.3% solids. After drying and milling to break up agglomerates, there was obtained approximately 1200 parts of lead arsenate made up of flat plate-like crystals having a particle size equal to or slightly larger than two different brands of flat type lead arsenate available on the open market. The product analyzed 32.53% arsenic as $As_2O_5$ and 63.80% lead as PbO. The water-soluble arsenic as $As_2O_5$ was 0.26%. It will be seen that this analysis corresponds to a lead arsenate containing one atom of lead for each atom of arsenic or in other words to a lead arsenate corresponding to the empirical formula $PbHAsO_4$ which lead arsenate will be seen to be the product of the reaction of litharge and arsenic acid according to the following equation:

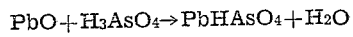
$$PbO + H_3AsO_4 \rightarrow PbHAsO_4 + H_2O$$

In place of acetic acid there may be substituted lactic acid, in which case the acidity desirably is maintained between pH 3 and pH 3.6, or sulfamic acid, in which case between pH 2 and pH 3.

While I have disclosed my invention with reference to particular embodiments thereof, it is to be understood that the invention is not limited to these particular embodiments but that variation may be made therein without departing from the spirit and scope of the invention as long as the litharge-arsenic acid strike is effected while maintaining the acidity of the reaction medium throughout the strike between the pH of the aqueous solution of the acidic catalyst and one pH point above.

The proportions are not critical and are determined largely as a matter of convenience. Desirably the litharge slurry, the batch tank slurry, and the arsenic acid solution are maintained as concentrated as possible. Excessively high concentrations simply mean that adequate agitation to maintain uniformity during the strike is difficult to achieve and excessively low concentrations simply mean that more water must be evaporated from the batch tank slurry in the drying operation. Similarly, the rate of addition of the reagents is not critical, being determined largely by the adequacy of the available agitation. The temperatures used were convenient but did not seem critical.

The processes of the invention are of particular advantage because within the limits of pH specified it is possible to obtain satisfactory flat type crystals from various grades of litharge without requiring excessive amounts of catalyst. It appears that different grades of litharge available on the market have different reactivities. With one such litharge it was observed that 12½ times as much acetic acid was required when the strike was effected while maintaining a pH consistently below 3.2 throughout the strike than was required when the strike was effected by maintaining a pH consistently above 3.2 and below 4.0. It was also observed that while a satisfactory flat type lead arsenate could be obtained from sublimed litharge following the method described in Patent 2,134,890, from 3 to 8 times as much acetic acid was required with two proprietary products, "insecticide grade" litharge and "flaked" litharge.

I claim:

1. In a process for the production of a lead arsenate in the form of flat, plate-like crystals, the steps comprising preparing an aqueous solution containing an acid which reacts with litharge to form a soluble lead salt, feeding into said aqueous acidic solution arsenic acid and litharge in substantially stoichiometric proportions for the formation of $PbHAsO_4$ and at such rates relative to each other as to maintain the acidity of the reaction medium thruout the reaction period between pH$x$ and pH$(x+1)$, where pH$x$ is the pH of the starting aqueous acidic solution, and at the end of said reaction period withdrawing the resulting lead arsenate from the reaction zone.

2. In a process for the production of a lead arsenate in the form of flat, plate-like crystals, the steps comprising preparing an aqueous solution containing an acid which reacts with litharge to form a soluble lead salt, feeding into said aqueous acidic solution an aqueous solution of arsenic acid and an aqueous litharge slurry in proportions such that the arsenic acid and the litharge are added in substantially stoichiometric amounts for the formation of $PbHAsO_4$ and at such rates relative to each other as to maintain the acidity of the reaction medium thruout the reaction period between pH$x$ and pH$(x+1)$, where pH$x$ is the pH of the starting aqueous acidic solution, and at the end of said reaction period withdrawing the resulting lead arsenate from the reaction zone.

3. In a process for the production of a lead arsenate in the form of flat, plate-like crystals, the steps comprising preparing an aqueous acetic acid solution at about pH 3.2, feeding into the aqueous acetic acid solution arsenic acid and litharge in substantially stoichiometric proportions for the formation of $PbHAsO_4$ and at such rates relative to each other as to maintain the acidity of the reaction medium thruout the reaction period between about pH 3.2 and pH 4, and at the end of said reaction period withdrawing the resulting lead arsenate from the reaction zone.

4. In a process for the production of a lead arsenate in the form of flat, plate-like crystals, the steps comprising preparing an aqueous acetic acid solution at about pH 3.2, feeding into the aqueous acetic acid solution an aqueous solution of arsenic acid and an aqueous litharge slurry in proportions such that the arsenic acid and the litharge are added in substantially stoichiometric amounts for the formation of $PbHAsO_4$ and at such rates relative to each other as to maintain the acidity of the reaction medium thruout the reaction period between about pH 3.2 and pH 4, and at the end of said reaction period withdrawing the resulting lead arsenate from the reaction zone.

ROBERT J. THRIFT.

REFERENCES CITED

The following references are of record in the file of this patent:

UNITED STATES PATENTS

| Number | Name | Date |
|---|---|---|
| 892,603 | Luther et al. | July 7, 1908 |
| 2,184,890 | Swaine | Dec. 26, 1939 |
| 2,291,642 | Les Veaux | Aug. 4, 1942 |
| 2,337,054 | Les Veaux | Dec. 21, 1943 |